(12) United States Patent
Gao

(10) Patent No.: US 9,680,166 B2
(45) Date of Patent: Jun. 13, 2017

(54) INTEGRATED GAS DIFFUSION LAYER WITH SEALING FUNCTION AND METHOD OF MAKING THE SAME

(71) Applicant: Yong Gao, Burnaby (CA)

(72) Inventor: Yong Gao, Burnaby (CA)

( * ) Notice: Subject to any disclaimer, the term of this patent is extended or adjusted under 35 U.S.C. 154(b) by 0 days.

(21) Appl. No.: 15/214,454

(22) Filed: Jul. 20, 2016

(65) Prior Publication Data
US 2016/0329579 A1 Nov. 10, 2016

Related U.S. Application Data

(62) Division of application No. 13/904,801, filed on May 29, 2013, now Pat. No. 9,425,469.

(51) Int. Cl.
| | |
|---|---|
| *H01M 8/0286* | (2016.01) |
| *H01M 8/0276* | (2016.01) |
| *H01M 8/0234* | (2016.01) |
| *H01M 8/0284* | (2016.01) |
| *B29C 45/14* | (2006.01) |
| *B29C 65/48* | (2006.01) |
| *H01M 8/0282* | (2016.01) |
| *H01M 8/1018* | (2016.01) |
| *B29K 83/00* | (2006.01) |
| *B29K 105/20* | (2006.01) |
| *B29K 707/04* | (2006.01) |

(Continued)

(52) U.S. Cl.
CPC ..... *H01M 8/0286* (2013.01); *B29C 45/14336* (2013.01); *B29C 65/4855* (2013.01); *H01M 8/0234* (2013.01); *H01M 8/0276* (2013.01); *H01M 8/0282* (2013.01); *H01M 8/0284* (2013.01); *B29K 2083/005* (2013.01); *B29K 2105/20* (2013.01); *B29K 2707/04* (2013.01); *B29K 2995/0065* (2013.01); *B29K 2995/0069* (2013.01); *B29L 2031/26* (2013.01); *B29L 2031/3468* (2013.01); *H01M 2008/1095* (2013.01); *Y02E 60/50* (2013.01); *Y02P 70/56* (2015.11); *Y10T 156/10* (2015.01)

(58) Field of Classification Search
CPC .......... H01M 8/1004; H01M 8/04201; H01M 8/0276; C25B 9/066; B25J 15/0616
See application file for complete search history.

(56) References Cited

U.S. PATENT DOCUMENTS

| | | | | |
|---|---|---|---|---|
| 2010/0015487 A1* | 1/2010 | Yoshimura | .......... | H01M 4/8636 429/494 |
| 2013/0068371 A1* | 3/2013 | Lee | ........................ | B32B 37/00 156/73.1 |

\* cited by examiner

*Primary Examiner* — Mark F Huff
*Assistant Examiner* — Monique Wills
(74) *Attorney, Agent, or Firm* — Han IP Corporation; Andy M. Han

(57) ABSTRACT

Techniques and implementations pertaining to an integrated gas diffusion layer with a sealing function are described. A method for making the integrated gas diffusion layer with the sealing function may involve placing a gas diffusion member inside a mold followed by injecting a sealing material into the mold. The method may also involve having the sealing material substantially covers a peripheral portion of the gas diffusion member and at least partially penetrates into a peripheral portion of the gas diffusion member. The method may further involve curing the sealing material to form a sealing member having a lip ring. A height of a portion of the mold corresponding to a non-lip ring portion of the sealing member is less than or equal to a thickness of the gas diffusion member.

8 Claims, 4 Drawing Sheets

(51) Int. Cl.
*B29L 31/26* (2006.01)
*B29L 31/34* (2006.01)

INTEGRATED GAS DIFFUSION LAYER
WITH SEALING FUNCTION AND METHOD
OF MAKING THE SAME

CROSS REFERENCE TO RELATED PATENT APPLICATION

The present disclosure is a divisional that claims the priority benefit of U.S. patent application Ser. No. 13/904,801, filed 29 May 2013, which is incorporated by reference in its entirety.

TECHNICAL FIELD

The present disclosure relates to fuel cells and, more particularly, relates to integrated gas diffusion layers with a sealing function and methods of making the same.

BACKGROUND

Fuel cells are devices that can convert chemical energy directly into electrical energy through electrode reaction of hydrogen and oxygen. A fuel cell typically includes multiple fuel cell units. Each fuel cell unit includes two electrodes (anode and cathode) separated from one another by an electrolyte material. The fuel cell units are stacked in series to form a fuel cell stack. An electrochemical reaction occurs as appropriate reactants are supplied to each electrode, i.e., the fuel is supplied to one electrode and the oxidant is supplied to the other electrode, thereby creating an electrical potential difference between the two electrodes. As a result, electrical energy is generated.

The core of the fuel cell is the fuel cell stack. Two ways to supply reactant gases to the fuel cell stack are presently known in the art. The reactant gases are supplied through common manifolds located either inside the fuel cell stack or outside the fuel cell stack. When gases are supplied through the common manifolds inside the fuel cell stack, the battery needs to be sealed to prevent leakage of the reactant gases and coolant as well as the mixing of the fuel, the oxidant, and the coolant through the common manifolds.

Ballard Inc.'s U.S. Pat. No. 5,284,718 describes placing sealing structures on the membrane electrode assembly (MEA) having a dimension the same as that of the bipolar plates. The MEA has three inlet through-openings and three outlet through-openings. Grooves are formed around peripheries of the through-openings and edges of the MEA in which the sealing structures are disposed. However, this approach is not suitable for thinner membranes. Based on the disclosure therein, Chinese Patent No. ZL200580042454 describes a sealing structure circumscribing the MEA. This may solve the limitation on the membrane thickness; however, due to the low utilization efficiency of the proton exchange membrane, waste may be incurred.

Another approach is to place sealing structures on bipolar plates by forming grooves around the peripheries of common manifolds and edges of the bipolar plates. The sealing structures are then disposed in the grooves. One drawback of this approach is the increased requirements for the sealant. The sealant, if penetrating into the reaction zone in the gas diffusion layer, may result in an increase in the concentration polarization.

The conventional way to make MEA is to adhere an insulating strengthening material to both sides of the proton exchange membrane to increase the strength of the proton exchange membrane. However, this manufacturing process is very complicated and time-consuming, and thus is not suitable for mass production.

SUMMARY

In order to solve the aforementioned problems, the present disclosure provides a non-traditional seal approach. Herein, the sealing material is provided on neither the bipolar plates nor the MEA, rather the sealing material is integrated with the gas diffusion layer.

In one aspect, an integrated gas diffusion layer with a sealing function is provided. The integrated gas diffusion layer may comprise a gas diffusion member and a sealing member substantially covering a peripheral portion of the gas diffusion member. The sealing member having fuel inlet and outlet openings, oxidant inlet and outlet openings, and coolant inlet and outlet openings.

In one embodiment, the sealing member may at least partially penetrate into the gas diffusion member at contact areas of the sealing member and gas diffusion member, thereby connecting the sealing member to the gas diffusion member.

In one embodiment, the sealing member may be affixed to the gas diffusion member by adhesive bonding.

In one embodiment, the sealing member may comprise a lip ring having a lip portion that is raised from the sealing member. The lip ring may be configured to be fitted into a sealing groove on a bipolar plate.

In one embodiment, the sealing member may be made of a rubber, a thermoplastic elastomer, or a thermosetting injection molding liquid silicone rubber.

In one embodiment, the gas diffusion member may be made of a carbon paper or a porous electrically conductive material.

In another aspect, a method of making an integrated gas diffusion layer with a sealing function is provided.

In one embodiment, a method of making an integrated gas diffusion layer with a sealing function may comprise the following steps: placing a gas diffusion member inside a mold; after clamping the mold, injecting a sealing material into the mold such that the sealing material substantially covers a peripheral portion of the gas diffusion member and at least partially penetrates into a peripheral portion of the gas diffusion member; and curing the sealing material to form a sealing member having a lip ring. The height of a portion of the mold corresponding to a non-lip ring portion of the sealing member is less than or equal to the thickness of the gas diffusion member.

In another embodiment, a method of making an integrated gas diffusion layer with a sealing function may comprise the following steps: providing a hollow region in a central part of a sealing member; covering the hollow region substantially by a gas diffusion member; and affixing the sealing member to the gas diffusion member by adhesive bonding at overlapping regions of the sealing member and the gas diffusion member. The hollow region has an area slightly smaller than the gas diffusion member.

The sealing member may be made of a rubber, a thermoplastic elastomer, or a thermosetting injection molding liquid silicone. The gas diffusion member may be made of a carbon paper or a porous electrically conductive material.

DETAILED DESCRIPTION OF PREFERRED EMBODIMENTS

The present disclosure is described below in more detail with reference to the accompanying drawings.

Embodiment 1

In the present disclosure, thermosetting injection molding liquid silicones, such as Liquid Silicone Rubber (LSR) are used to make the sealing member, and carbon papers are used to make the gas diffusion member.

A carbon paper is placed in a hot mold. Injection molding liquid silicone rubber LSR is fed into a hot mold through a cold runner. The temperature of the hot mold is kept between 140° C. and 200° C. After filling the mold with the silicone rubber, the silicone rubber is cured for 50-60 seconds. The resulting integrated gas diffusion layer is removed from the mold.

Figure 1:
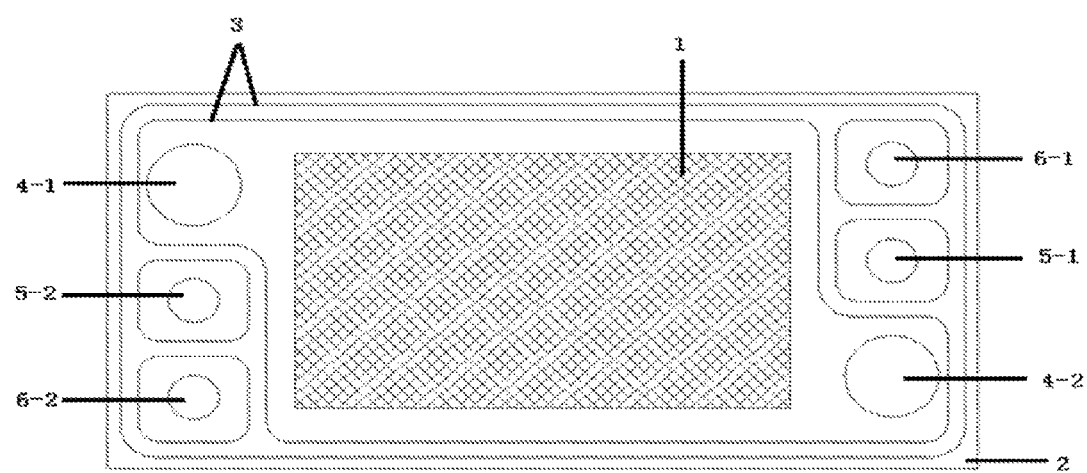
FIG. 1 is a top view of an integrated gas diffusion layer in accordance with the present disclosure.
Figure 2:
FIG. 2 is a cross-sectional view of the integrated gas diffusion layer in accordance with the present disclosure.
Figure 3:
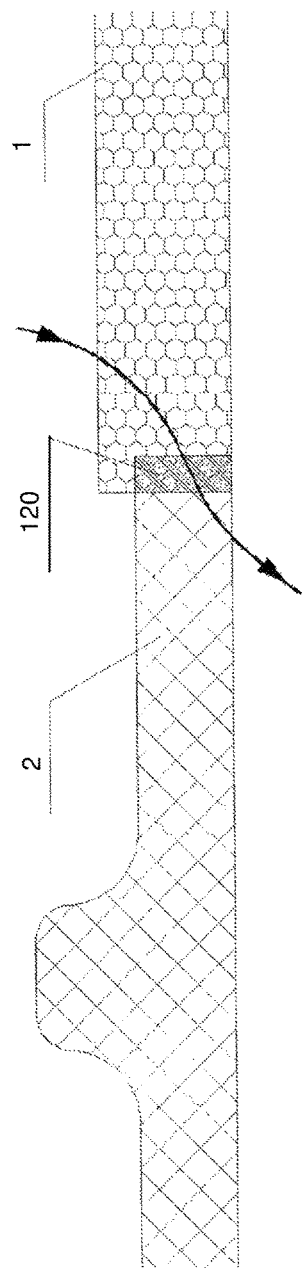
FIG. 3 is an enlarged cross-sectional view of the integrated gas diffusion layer in accordance with one embodiment of the present disclosure showing a penetration portion formed at the contact area of the sealing member and the gas diffusion member.

Referring to FIGS. 1 and 2, the integrated gas diffusion layer after the curing process includes a gas diffusion member 1 and a sealing member 2. The sealing member 2 is provided with fuel inlet and outlet openings 4-1, 4-2, oxidant inlet and outlet openings 6-1, 6-2, and coolant inlet and outlet openings 5-1, 5-2. The peripheral portion of the gas diffusion member 1 is at least substantially or completely covered by the sealing member 2. As shown in FIG. 3, since the gas diffusion member 1 is made of a porous material, the sealing material may penetrate into the gas diffusion member 1 at the contact area 120 of the sealing member 2 and the gas diffusion member 1, thus forming an integrated structure. The penetration results in a transverse sealing (indicated by the black arrow) in the contact area 120. In this way, no water or gas can permeate through the contact area 120. The sealing member 2 also includes a lip ring 3 having a lip portion that is raised from the sealing member 2.

In one embodiment, the material for the sealing member 2 is silicone or thermoplastic elastomer, or thermosetting injection molding liquid silicone rubber.

In one embodiment, the material for the gas diffusion member 1 is carbon paper or a porous electrically conductive material. After injection molding, the sealing member 2 except the lip ring portion thereof has a thickness less than or equal to a thickness of the gas diffusion member 1.

Figure 4:
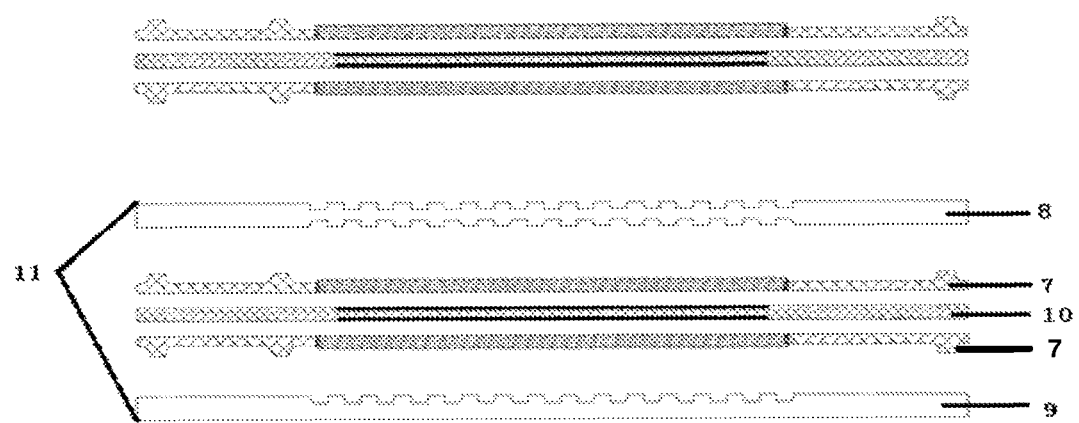
FIG. 4 is a schematic view of a fuel cell unit in accordance with the present disclosure.

Referring to FIG. 4, a fuel cell unit 11 may comprise two integrated gas diffusion layers 7 sandwiched between a cathode plate 8 and an anode plate 9, and a MEA 10 disposed between the two integrated gas diffusion layers 7. Each of the fuel inlet and outlet openings, the oxidant inlet and outlet openings, and the coolant inlet and outlet openings formed on each of the integrated gas diffusion layers 7 corresponds to a respective one of the three inlet openings and three outlet openings formed on the corresponding bipolar plate (cathode plate 8, anode plate 9). The lip ring 3 on each of the integrated gas diffusion layers 7 corresponds to the sealing groove formed on the corresponding bipolar plate. When the fuel cell unit 11 is pressed, the lip ring 3 on each of the integrated gas diffusion layers 7 is fitted into the sealing groove on the corresponding bipolar plate. The sealing member 2 of each of the integrated gas diffusion layers 7 comes to rest against the corresponding bipolar plate and the MEA, thereby sealing the bipolar plates and the MEA.

The surface area of each of the gas diffusion member 1 in the integrated gas diffusion layers 7 is greater than both the catalyst coating on the MEA and the reaction area of the flow channel on the bipolar plate. Thus, although the sealing material penetrates into the peripheral portion of the gas diffusion member during the injection molding and curing processes, after excluding the sealant penetration area, the remaining active area of the gas diffusion member is still greater than or equal to both the catalyst coating on the MEA and the reaction area of the flow channel on the bipolar plate. As a result, the reaction area of the electrode assembly is not reduced.

The sealing member 2 of the present embodiment may be made of silicone, thermoplastic elastomer, or thermosetting injection molding liquid silicone rubber. For different sealing materials, the injection temperature and time or the curing temperature and dwell time may be different.

Embodiment 2

The present embodiment is similar to Embodiment 1. One difference is the manufacturing process of the integrated gas diffusion layer.

Referring to FIG. 1, the sealing member 2 in the integrated gas diffusion layer with a sealing function of the present embodiment has a hollow region situated in the central part of the sealing member 2. The area of the hollow region is slightly smaller than that of the gas diffusion member 1, thus the hollow region is at least substantially or completely covered by the gas diffusion member 1. The integrated gas diffusion layer is formed by adhering the gas diffusion member 1 and the sealing member 2 together at overlapping regions by adhesive bonding. The sealing member 2 also includes a lip ring 3 having a lip portion that is raised from the sealing member 2.

All the materials used in the present embodiment are the same as those used in embodiment 1.

One of advantages of the present disclosure is that the current design in which the gas diffusion layer and the sealant are integrated avoids the possible shedding of the seals, while at the same time it will increase the seal strength. In addition, the two sealing members are disposed respectively between the anode plate and the MEA as well as the cathode plate and the MEA, thus the seal performance can be significantly improved. Furthermore, since there is no need to place insulting strengthening films on both sides of the proton exchange membrane, such design can greatly improve production efficiency and reliability.

Moreover, as to the conventional method in which the gasket is integrally formed with either the bipolar plate or the MEA, since the manufacturing costs of the bipolar plate and the MEA, especially the MEA, are rather high, if the bipolar plate or the MEA is damaged during the integration process, the manufacturing cost of the whole fuel cell will be greatly increased. This problem can be effectively solved by the integration of the seal and the gas diffusion layer.

What is claimed is:

1. A method of making an integrated gas diffusion layer with a sealing function, comprising:
   placing a gas diffusion member inside a mold;
   injecting a sealing material into the mold such that the sealing material substantially covers a peripheral portion of the gas diffusion member and at least partially penetrates into a peripheral portion of the gas diffusion member; and curing the sealing material to form a sealing member having a lip ring,
wherein a height of a portion of the mold corresponding to a non-lip ring portion of the sealing member is less than or equal to a thickness of the gas diffusion member.

2. The method of claim 1, wherein a contact area between the sealing material and the gas diffusion member is created by the sealing material penetrating into the peripheral portion of the gas diffusion member, and wherein the contact area creates a transverse sealing that prevents water and gas from permeating through the contact area.

3. The method of claim 1, wherein the sealing member comprises a rubber, a thermoplastic elastomer, or a thermosetting injection molding liquid silicone rubber.

4. The method of claim 1, wherein the gas diffusion member comprises a carbon paper or a porous electrically conductive material.

5. The method of claim 1, wherein the lip ring has a lip portion raised from the sealing member and comprises a continuous integral piece.

6. The method of claim 1, wherein the curing of the sealing material to form the sealing member comprises keeping the mold between 140° C. and 200° C.

7. The method of claim 1, wherein the curing of the sealing material to form the sealing member comprises curing the sealing material for 50-60 seconds.

8. The method of claim 1, wherein the injecting of the sealing material into the mold comprises injecting the sealing material into the mold through a runner having a first temperature lower than a second temperature of the mold.

* * * * *